United States Patent [19]
Zaborowski

[11] Patent Number: 4,650,955
[45] Date of Patent: Mar. 17, 1987

[54] METHOD AND APPARATUS FOR SPLITTING LEATHER USING A LASER

[76] Inventor: Jerome R. Zaborowski, 149 Wilson Ave., West Bend, Wis. 53095

[21] Appl. No.: 846,117

[22] Filed: Mar. 31, 1986

[51] Int. Cl.⁴ .............................................. B23K 26/00
[52] U.S. Cl. .............................. 219/121 LG; 69/21.5; 219/121 LN; 219/121 FS; 219/121 LW
[58] Field of Search ................. 219/121 LN, 121 LG, 219/121 LW, 121 FS; 69/9, 9.1, 21.5

[56] References Cited

U.S. PATENT DOCUMENTS

| | | | |
|---|---|---|---|
| 3,154,371 | 10/1964 | Johnson | 219/121 LW X |
| 3,860,784 | 1/1975 | Brown et al. | 219/121 FS X |
| 3,965,328 | 6/1976 | Locke | 219/121 FS X |
| 4,560,855 | 12/1985 | Takatuji et al. | 219/121 LW X |

FOREIGN PATENT DOCUMENTS

| | | | |
|---|---|---|---|
| 0126787 | 12/1984 | European Pat. Off. | 219/121 LD |
| 0047085 | 3/1984 | Japan | 219/121 FS |

*Primary Examiner*—C. L. Albritton
*Attorney, Agent, or Firm*—David B. Smith

[57] ABSTRACT

A method and apparatus for splitting leather wherein the leading end of a length of leather is held between a pair of calendar rolls, and a focused laser beam is caused to sweep across the leading end of the length of leather to cut a first layer of leather away from a second layer. A rotating mirror assembly is provided for directing the focused laser beam against the face of the leather and for causing the beam to sweep across the face of the leather.

3 Claims, 5 Drawing Figures

METHOD AND APPARATUS FOR SPLITTING LEATHER USING A LASER

FIELD OF THE INVENTION

The invention is directed to a method and apparatus for splitting leather.

BACKGROUND PRIOR ART

Manufacture of products made of leather requires splitting pieces of leather to reduce the thickness of the pieces of leather before they can be used in the production of leather products.

In the prior art methods for splitting leather to reduce its thickness, pieces of leather are fed between a pair of horizontal rollers or calendar rolls. The rollers clampingly engage the upper and lower surfaces of the leather to hold that portion of the leather in place. A horizontally extending blade engages the leading edge of the piece of leather held between the rollers and forms a horizontal cut in the leather. The lower layer can be removed leaving a top layer for use in the manufacturing operation. The horizontally extending blade can comprise a flexible endless band with the blade moving across the leading edge or face of the leather and in a direction perpendicular to the direction of movement of the leather between the rollers.

One of the problems with such prior art arrangements is that the continuous moving blades or bands require replacement at frequent intervals. This results in substantial cost for replacement of the blades and down time of the leather splitting machines.

Another problem with the prior art apparatus is that when the blades become dull or damaged, they can cause an increased generation of scrap and can result in waste of a great deal of leather.

Attention is directed to the Cannon et al. U.S. Pat. No. 4,029,535, issued June 14, 1977; the Miller U.S. Pat. No. 4,500,771, issued Feb. 19, 1985; IBM Technical Disclosure Bulletin, Volume 20, No. 11B, April 1978, pages 4939–4940 and IBM Technical Disclosure Bulletin Volume 22, No. 6, November 1979, pages 2463–2464.

Attention is further directed to the Houldcroft U.S. Pat. No. 3,612,814, issued Oct. 12, 1971; the Ehlesheid et al. U.S. Pat. No. 4,049,945, issued Sept. 20, 1977; and the Stemmler et al. U.S. Pat. No. 4,160,894, issued July 10, 1979.

SUMMARY OF THE INVENTION

The present invention provides an improved method and apparatus for splitting leather which avoids the deficiencies of the prior art in connection with replacing blades.

The present invention includes a method for splitting leather wherein a focused laser beam is caused to sweep across the leading edge of a piece of leather clampingly held between a pair of calendar rolls to cut the leading edge of the leather and to thereby separate one layer of leather material from the remainder of the leather. A rotating mirror assembly can be employed to cause the focused laser beam to repeatedly sweep across the leading edge of the leather piece to form a narrow cut in the leather and thereby split the leather or separate the lower layer of leather from the remainder of the leather.

More particularly, the invention includes a method for splitting leather including the steps of supporting a piece of leather between a pair of rollers, with a leading edge of the piece of leather clamped between the rollers, and feeding the piece of leather between the rollers in a first direction. The method also includes providing means for producing a laser beam, focusing the laser beam such that the laser beam will have a focal point between the rollers, and causing the laser beam to sweep across the leading edge of the layer of leather, with the beam moving in a plane parallel to the opposite surfaces of the piece of leather and between the opposite surfaces of the piece of leather, and with the focal point of the laser beam striking the leading edge of the piece of leather between the opposite surfaces and cutting the leather to separate the layer of leather into two layers.

In one form of the invention the step of causing the laser beam to sweep across the leading edge of the layer of leather includes the steps of providing a mirror supported for rotation around an axis perpendicular to the layer of leather, causing rotation of the mirror about that axis, and directing the laser beam against the mirror whereby rotation of the mirror about the axis will cause the laser beam to repeatedly sweep along the length of the leading edge of the layer of leather to cut the leather between the opposite surfaces of the layer of leather.

In one form of the invention the method further includes the step of directing jets of noncombustible gas at the leading edge of the layer of leather to prevent charring of the leather material and to disperse any particles from the path of laser beam.

The invention also includes an apparatus for splitting a piece of leather, the apparatus including a pair of spaced apart rollers adapted to clampingly engage and secure a piece of leather therebetween, one of the rollers engaging one surface of a leading edge of the piece of leather and the other of the rollers engaging the other surface of the leading edge of the piece of leather. Means are also provided for causing rotation of the rollers to cause movement of the piece of leather through the space between the rollers and in a first direction of movement. The apparatus also includes a laser for generating a laser beam, and means for focusing the laser beam such that the laser beam will include a focal point. Means are also provided for causing the focal point of the laser beam to repeatedly sweep along the leading edge of the piece of leather clampingly engaged between the rollers and from adjacent one edge of the piece of leather to adjacent the opposite edge of the piece of leather in a line parallel to the opposite surfaces of the piece of leather. As the focal point of the laser beam sweeps along the length of the leading edge of the leather, the laser beam cuts the leather to separate one layer of the piece of leather from a second layer of the piece of leather.

In one form of the invention the means for causing the focal point of the laser to sweep along the leading edge of the piece of leather includes a mirror assembly, the mirror assembly including a plurality of mirror surfaces joined together in edge-to-edge relation and surrounding a central axis of rotation, and the mirror surfaces facing outwardly with respect to the central axis of rotation.

In one embodiment of the invention means are further provided for discharging non-combustible gas toward the leading edge of the piece of leather where the focal point of the laser beam strikes the leading edge of the piece of leather.

In one embodiment of the invention means are further provided for separating one layer of leather from the other layer of leather. The means for separating includes a diverter blade having an edge adjacent the leading edge of the piece of leather, and the edge of the diverter blade includes a pluraltiy of gas discharge ports for discharging the non-combustible gas toward the leading edge of the piece of leather.

Various other features and advantages of the invention will be apparent by reference to the following description of a preferred embodiment, from the claims and from the drawings.

Figure 5:
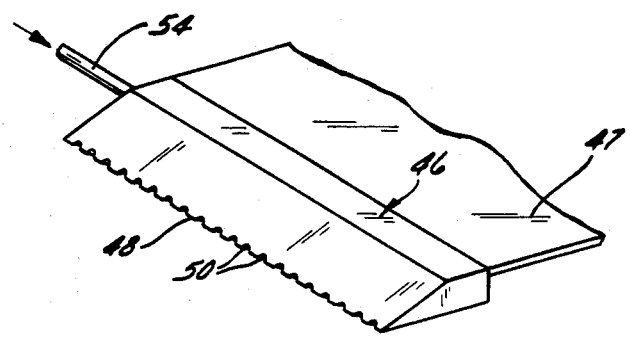
FIG. 5 is an enlarged perspective view of a part diverter illustrated in FIGS. 1, 2 and 4.

Before describing the invention in detail, it is to be understood that the invention is not limited in its application to the details of construction and to the specific arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF A PREFERRED EMBODIMENT

Figure 1:
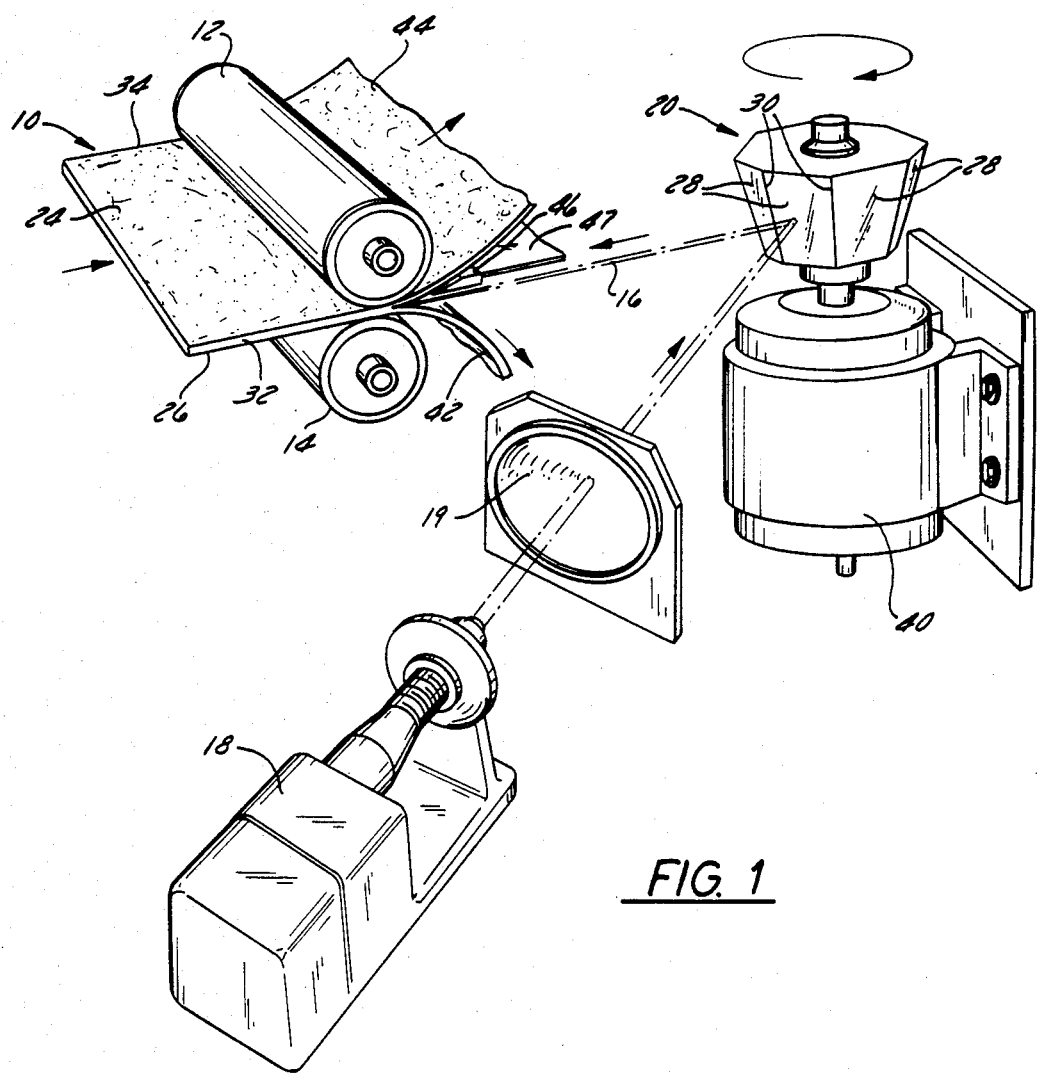
FIG. 1 is a perspective view of an apparatus embodying the invention and for use in practicing the method of the invention.
Figure 2:
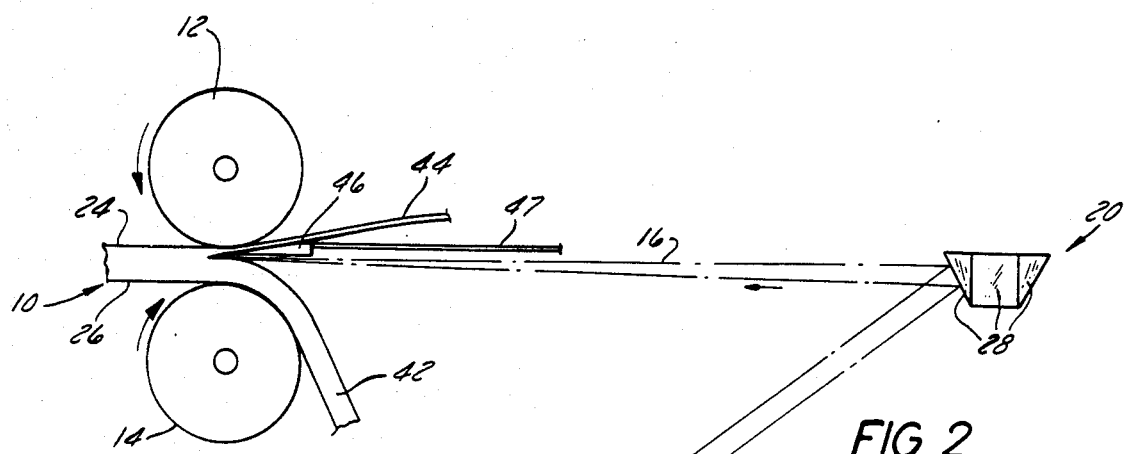
FIG. 2 is a schematic side elevation view of the apparatus illustrated in FIG. 1.

Illustrated in FIG. 1 is an apparatus embodying the present invention and for use in splitting pieces of leather to reduce the thickness of the leather and to produce thin pieces of leather to be used in manufacturing operations.

The apparatus includes a means for supporting a piece of leather 10 and means for feeding the piece of leather 10 between a pair of calendar rolls or rollers 12 and 14. The apparatus for supporting the leather and for feeding it to the calendar rolls is conventional and is not shown. The piece of leather 10 is fed between the pair of calendar rolls 12 and 14 and is clampingly engaged between those rolls such that it is held firmly in position. The calendar rolls 12 and 14 provide a means for firmly securing the leather in a horizontal flat relationship and for securing the leading end, or portion of the leather to be cut, firmly in place so that an accurate cut can be made across the leading edge of the piece of leather.

While in the illustrated arrangement the calendar rolls 12 and 14 are shown as being positioned such that they are rotatable about horizontal axes and vertically spaced apart from one another, it will be understood by those skilled in the art that in other arrangements the leather and calendar rolls could be positioned in other orientations.

Means are also provided for generating a laser beam 16 and for causing that laser beam 16 to sweep across the leading edge of the piece of leather positioned between the calendar rolls and such that the laser beam can cut the leading edge of the leather to separate a lower layer of the leather from an upper layer. The means for generating the laser beam 16 includes a conventional laser 18 of the type commonly used in industrial applications. For example, a conventional carbon dioxide laser can be employed.

Means are also provided for focusing the beam 16 generated by the laser 18 such that the energy of the light at the focal point of the beam is sufficiently concentrated that it will efficiently vaporize the leather material struck by the focal point of the laser beam to cut the leather and to separate a lower layer of leather from an upper layer. A common commercially available laser will normally generate a beam of light which is approximately ⅜ inches in diameter. The energy of this beam of light is ineffective to cut the leather material. However, if the beam is focused, the energy of the light at the focal point can effectively vaporize the leather material. In the illustrated arrangement the means for focusing the beam comprises a lens 19, and the lens 19 is constructed such that the focal point of the laser beam will be located in the space between the calendar rolls 12 and 14.

Figure 3:
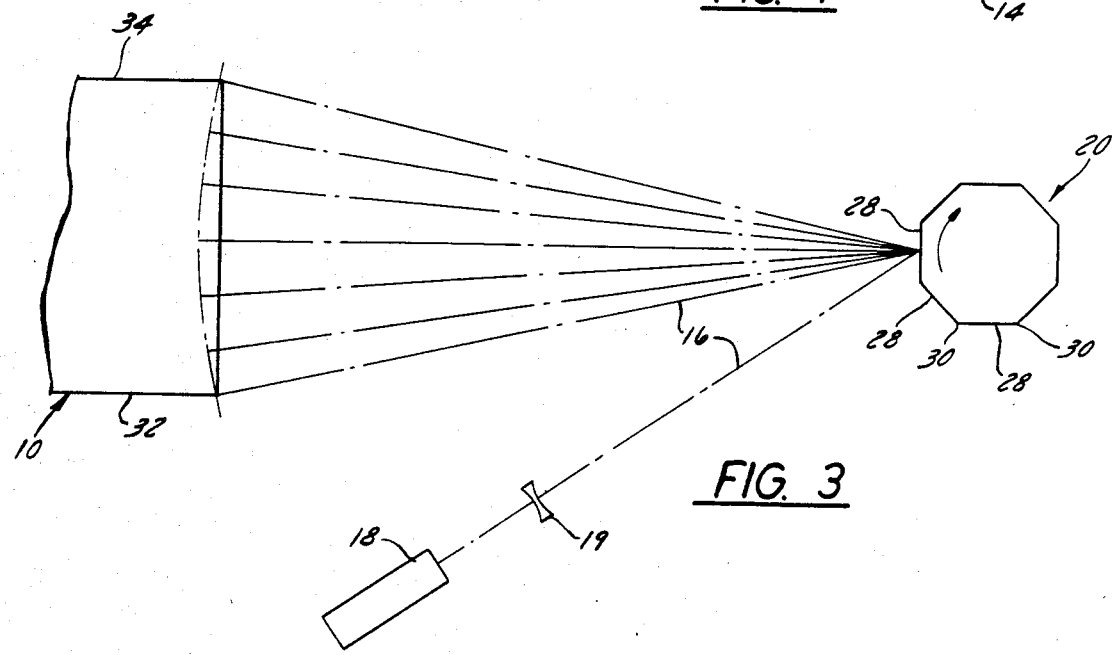
FIG. 3 is a schematic plan view of the apparatus illustrated in FIG. 1.

Means are also provided for causing the focal point of the beam 16 from the laser 18 to sweep across the face of the leading edge of the leather such that the focal point of the laser beam will make successive shallow cuts in the leather as it sweeps across the face of the leather as seen in FIG. 3. In the illustrated arrangement, the means for causing the focal point of the laser beam to sweep across the leading edge of the leather from one side of the piece of leather to the other comprises a mirror assembly 22 supported for rotation about a central vertical axis perpendicular to the horizontal planes defined by the upper and lower surfaces 24 and 26 of the leather. The mirror assembly 22 includes a plurality of planar mirrors 28 each having vertical edges 30, and the mirrors 28 are positioned in edge-to-edge abutting relation so as to form a polygon of reflecting surfaces facing outwardly with respect to the axis of rotation of the mirror assembly 22.

In the illustrated arrangement the mirrors 28 are mounted or supported such that they define an acute angle with respect to the vertical axis of rotation of the mirror assembly 22 and such that the mirros slope upwardly and outwardly, the angle of the mirros with respect to the vertical axis of rotation of the mirror assembly being such that a beam 16 emitted by the laser will be reflected by the mirror and strike the leading edge of the piece of leather.

While in the illustrated arrangement the mirror assembly is comprised of eight mirrors 28 placed in edge-to-edge relation so as to form an octagon, in other arrangements fewer or more mirrors could be employed in the mirror assembly 22, and the polygon defined by the mirrors could have more or fewer than eight sides.

Means are also provided for causing rotation of the mirror assembly 22 about the central vertical axis of rotation such that the laser beam 16 reflected by the mirrors will be caused to repeatedly sweep across the face of the leading edge of the length of leather from one edge 32 of the leather to the other edge 34 and in a plane parallel to and between the upper and lower surfaces 24 and 26 of the piece of leather. As best illustrated in FIG. 3, as a panel of the mirror assembly rotates around the central vertical axis of the mirror assembly, the beam 16 reflected by one of the mirrors, will move through an acute angle, and the focal point of the focused laser beam 16 will move rapidly from one edge 32 of the piece of leather to the opposite edge 34.

While various apparatus could be provided for causing rotation of the mirror assembly, in the illustrated arrangement the mirror assembly 22 can be fixedly mounted on the shaft of a hysteresis sychronous motor 40. Suitable motors are manufactured by Vernitech, 300 Marcus Boulevard, Deer Park, N.Y. 11729.

In some conventional leather splitting operations an entire hide is split and the rollers may be 8 feet in length. When the distance between the opposite edges of the piece of leather is large, a lens assembly of the type illustrated in IBM Technical Disclosure Bulletins, Vol. 20, No. 11B, April 1978, pages 4939–4940 and Vol. 22, No. 6, November 1979, pages 2463–2464 can be employed to cause the focal point of the laser beam to trace a linear path as it moves along the length of the leading edge of the piece of leather held between the rollers.

While in the illustrated arrangement the laser is shown as being positioned below and to the side of a line extending from the mirror assembly to the calendar rolls, in other applications the mirror assembly could be constructed such that the laser could be positioned in other locations with respect to the mirror assembly and calendar rolls. For example, the laser could be positioned beneath the mirror assembly with the laser directed upwardly and with the mirror assembly having a configuration such that the laser beam emitted by that laser will be reflected so as to be directed against the leading edge of the piece of leather.

In the illustrated form of the invention, means are also provided for separating the scrap layer or substrate 42 of leather material from the upper layer 44. In the illustrated construction, this means is comprised of a part diverter 46 positioned above the laser beam. The upper part diverter 46 includes a blade edge 48 positioned above the plane of the sweeping laser beam and adjacent the leading edge of the leather or the area where the laser beam strikes the leading edge of the leather piece. The diverter blade 48 causes the upper portion or layer of the leather to be carried upwardly away from the laser beam. The apparatus also includes a thin plate 47 having an upper surface for supporting the upper layer of leather. The upper layer of leather is then removed from the supporting plate 47 by the operator. The lower layer of leather can fall into a collecting bin.

Figure 4:
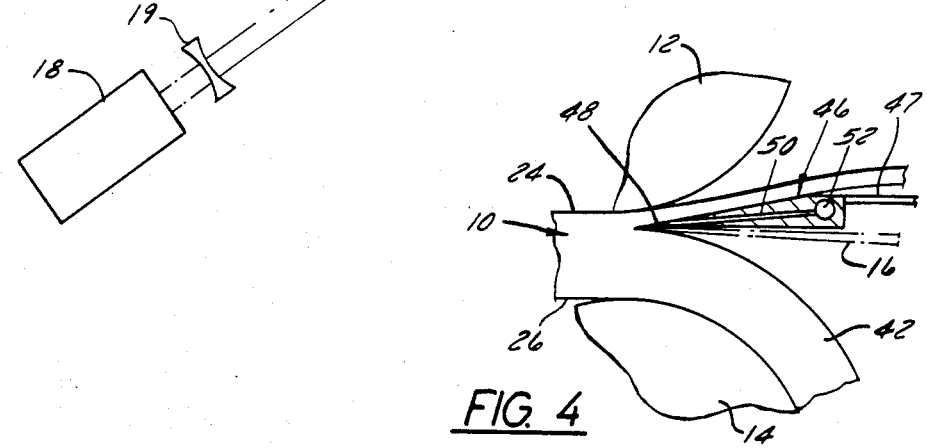
FIG. 4 is an enlarged partial view of the apparatus shown in FIG. 2 and with portions shown in cross section.

In one embodiment of the invention, means are also provided for directing a non-combustible gas toward the leading edge of the piece of leather as the laser beam focal point sweeps across the leading edge of the leather from one edge of the leather to the opposite edge. This means for directing a non-combustible gas toward the leading edge of the piece of leather functions to prevent charring or any excess burning of the leather material and also disperses any particles from the path of the focal point of the laser beam. If the area adjacent the leading edge of the leather includes particles entrained in the air, the efficiency of operation of the laser beam is reduced. While various means could be provided for directing a non-combustible gas at the face of the leather, in the illustrated arrangement the diverter plate 46 is provided with a plurality of gas outlet ports 50 spaced apart along its forward edge and facing the opposed leading edge of the piece of leather. The diverter plate 46 can include a plenum chamber 52 therein (FIG. 4) extending along its length and connected by a conduit 54 (FIG. 5) to a source of noncombustible gas, such as nitrogen. Nitrogen can be supplied under pressure to the plenum chamber 52 in the diverter plate 46 and will be discharged toward the leather through the discharge ports 50. The ports 50 will function as nozzles to direct the nitrogen toward the leading edge of the leather and causing oxygen in that area to be dispersed. In operation, as the laser beam sweeps across the face of the leading edge of the leather, the leather material will be cut by the laser beam and combustion will be prevented because of the absence of oxygen in the immediate area of the leading edge of the piece of leather. The jets of nitrogen directed against the face of the leather will also function to remove heat from the leather and will prevent the laser beam from generating heat in the piece of leather which would otherwise damage the leather. This is true particularly because the nitrogen gas is directed at the specific area of the face of the leather, where the leather is burned by the focal point of the laser beam. The jets of gas will also disperse any random particles from the path of the focal point of the laser beam thereby improving the efficiency of operation of the laser.

Various features of the invention are set forth in the following claims:

1. A method for splitting leather, the method comprising:
    supporting a piece of leather having opposite surfaces and opposite edges between a pair of rollers, with a leading edge of the piece of leather clamped between the rollers and with one of the rollers engaging one of the opposite surfaces and with the other of the rollers engaging the other of the opposite surfaces,
    feeding the layer of leather between the rollers in a first direction,
    providing a means for producing a laser beam,
    focusing the laser beam such that the laser beam will have a focal point between the rollers, and
    causing the focused laser beam to sweep across the leading edge of the layer of leather, such that the laser beam moves in a plane parallel to the opposite surfaces of the piece of leather, the plane of the laser beam being between the opposite surfaces of the piece of leather, and such that the focal point of the laser beam strikes the leading edge of the piece of leather between the opposite surfaces and cuts the leather at the leading edge to separate the layer of leather into two layers.

2. A method as set forth in claim 1 wherein said step of causing the laser beam to sweep across the leading edge of the layer of leather includes the steps of providing a mirror supported for rotation around an axis perpendicular to the planes of the opposite surfaces of the layer of leather, causing rotation of the mirror about said axis, and directing said laser beam against said mirror, whereby rotation of said mirror about said axis will cause said laser beam to sweep along the length of said leading edge of said layer of leather to burn said leather between said opposite surfaces of said layer of leather.

3. A method as set forth in claim 1 and further including the step of directing jets of gas at said leading edge of said layer of leather to prevent combustion of said leather material.

* * * * *